US005163972A

United States Patent [19]

Herter et al.

[11] Patent Number: 5,163,972

[45] Date of Patent: Nov. 17, 1992

[54] PROCESS FOR THE DYEING OF POLYACRYLONITRILE MATERIALS WITH CATIONIC BENZO-THIAZOLIUM AZO DYE

[75] Inventors: Wilfried Herter, Rheinfelden, Fed. Rep. of Germany; Josef Koller, Reinach, Switzerland

[73] Assignee: Ciba-Geigy Corporation, Ardsley, N.Y.

[21] Appl. No.: 621,405

[22] Filed: Dec. 3, 1990

[30] Foreign Application Priority Data

Dec. 6, 1989 [CH] Switzerland .......................... 4367/89

[51] Int. Cl.$^5$ ...................... C09B 29/45; C09B 44/20; D06P 1/08; D06P 3/76

[52] U.S. Cl. ........................................... 8/655; 8/524; 8/527; 8/639; 8/654; 8/657; 8/662; 8/690; 8/691; 8/927; 534/607

[58] Field of Search ................... 8/655, 524, 527, 639, 8/691

[56] References Cited

U.S. PATENT DOCUMENTS

| | | | |
|---|---|---|---|
| 2,889,315 | 6/1959 | Bossard et al. | 534/61 |
| 3,078,137 | 2/1963 | Baumann et al. | 8/657 |
| 3,455,898 | 7/1969 | Seefelder et al. | 534/788 |
| 4,292,238 | 9/1981 | Kuhlthau | 534/589 |
| 4,382,801 | 5/1983 | Loew | 8/538 |
| 4,508,536 | 4/1985 | Erzinger et al. | 8/639 |
| 4,536,185 | 8/1985 | Lapple et al. | 8/527 |
| 4,638,053 | 1/1987 | Neeb et al. | 534/589 |

FOREIGN PATENT DOCUMENTS

| | | |
|---|---|---|
| 66405 | 8/1982 | European Pat. Off. . |
| 033717 | 8/1977 | Japan . |
| 1276686 | 6/1972 | United Kingdom . |
| 1411243 | 10/1975 | United Kingdom . |
| 1449819 | 9/1976 | United Kingdom . |
| 2001666 | 2/1979 | United Kingdom . |

OTHER PUBLICATIONS

A. P. D'Rozario et al., J. Chem. Soc. Perkin Trans. II, 1987, 1781-1784.

*Primary Examiner*—A. Lionel Clingman
*Attorney, Agent, or Firm*—Marla J. Mathias; Edward McC.Roberts

[57] ABSTRACT

Process to dye polyacrylonitrile in blue shades with cationic dye compounds: substituted benzothiazolium azo N-alkyl-N-hydroxyalkyl alkyl-aniline salts.

13 Claims, No Drawings

PROCESS FOR THE DYEING OF POLYACRYLONITRILE MATERIALS WITH CATIONIC BENZO-THIAZOLIUM AZO DYE

The present invention relates to a process for the dyeing of polyacrylonitrile materials, to dyes for carrying out this process and to solid and liquid dye preparations.

The dyes used for dyeing polyacrylonitrile materials in blue shades include cationic azo dyes which are prepared by coupling diazotized 2-aminobenzothiazoles on to substituted anilines. However, the currently used dyes do not yet optimally fulfil the requirements in all properties. Thus, for example, the steaming and decatizing fastness of the dyeings obtained with the known blue dyes is not yet always completely satisfactory and the reduction and pH stability of the dye preparations or dye baths also sometimes leaves something to be desired.

Accordingly, there was a need for novel blue dyes and a dyeing process which has the abovementioned disadvantages to a lesser extent or not at all. It has been found that the dyeing process according to the invention and the dyes according to the invention satisfy these requirements.

Accordingly, the present invention relates to a process for the dyeing of polyacrylonitrile materials, which comprises using a dye of the formula

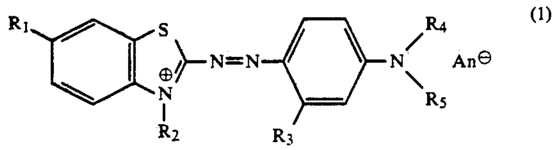

in which $R_1$ is $C_1$–$C_4$alkoxy or chlorine, $R_2$ is $C_1$–$C_4$alkyl, $R_3$ is $C_1$–$C_4$alkyl, $R_4$ is $C_1$–$C_2$alkyl, $R_5$ is hydroxyethyl or hydroxypropyl, and $An^{\ominus}$ is an anion, in which $R_3$ and $R_4$ are not both ethyl at the same time.

The alkyl and alkoxy groups of the above formula (1) can be straight-chain or branched. Examples of suitable radicals are methyl, ethyl, n-propyl, iso-propyl, n-, sec or tert-butyl, methoxy, ethoxy, n- or iso-propoxy and n-, sec- or tert-butoxy.

Examples of suitable hydroxypropyl groups are 3-hydroxyprop-1-yl or in particular 2-hydroxyprop-1-yl.

Suitable anions $An^{\ominus}$ are not only inorganic but also organic anions; examples are: halide ions, such as chloride, or iodide ions, sulfate, methyl sulfate, tetrafluoroborate, aminosulfonate, perchlorate, carbonate, bicarbonate, phosphate, phosphomolybdate, phosphotungstate, phosphotungstomolybdate, benzenesulfonate, naphthalenesulfonate, 4-chlorobenzenesulfonae, oxalate, maleate, acetate, propionate, lactate, succinate, chloroacetate, tartrate, methanesulfonate or benzoate ions, or complex anions, such as that of chlorozinc complex salts.

The anion is in general predetermined by the preparation process. Preferably, the chlorides, hydrogen sulfates, sulfates, methosulfates, phosphates, formates, lactates or acetates are present. The anions can be exchanged for other anions in a known manner.

A preferred embodiment of the invention is one in which a dye of the formula (1) in which $R_1$ is methoxy or ethoxy is used.

Furthermore, the use of those dyes of the formula (1) in which $R_2$ is methyl or ethyl and of those in which $R_3$ is methyl or ethyl is preferred.

$R_4$ is methyl or ethyl and $R_5$ is preferably hydroxyethyl.

The particularly preferred process according to the invention consists in using a dye of the formula

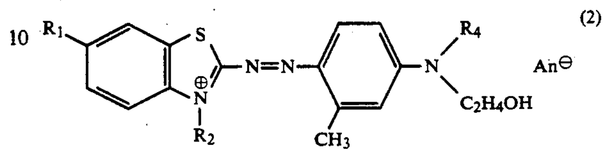

in which $R_2$ and $R_4$, independently of another, are each methyl or ethyl and $R_1$ is methoxy or ethoxy. Preferably, $R_2$ is methyl, $R_4$ is ethyl and $R_1$ is methoxy.

The dyes of the formula (1) are novel and are also provided by the present invention.

Of these, those of the formula (1) are preferred in which $R_1$ is methoxy or ethoxy, $R_2$ and $R_4$, independently of one another, are methyl or ethyl, $R_3$ is methyl and $R_5$ is hydroxyethyl.

Particularly preferred dyes have the formula

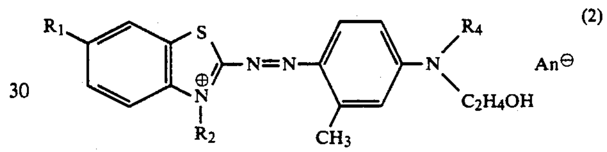

in which $R_1$ is ethoxy or in particular methoxy and $R_2$ and $R_4$, independently of one another, are each methyl or ethyl. In very particularly preferred dyes of the formula (2), $R_2$ is methyl and $R_4$ is ethyl.

The novel cationic azo dyes of the formula (1) can be prepared by processes known per se. They are obtained, for example, by diazotizing a compound of the formula

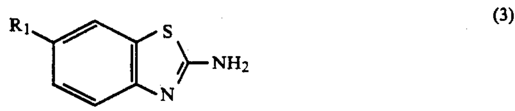

coupling the product onto a coupling component of the formula (4)

and quaternizing the coupled product with a compound of the formula $$R_2\text{—}An \quad (5)$$

in which $R_1$, $R_3$, $R_4$, $R_5$ and $R_2$ are as defined under formula (1) and An is a radical which can be converted into the anion $An^{\ominus}$ upon quaternization.

The compounds of the formula (3) are known or can be prepared by methods known per se. The coupling components of the formula (4) and the compounds of the formula (5) are also known or preparable by methods known per se.

The diazotization of the compounds of the formula (3) is carried out in a manner known per se, for example by means of sodium nitrite in aqueous acid, for example hydrochloric acid or sulfuric acid, medium. However, the diazotization can also be carried out by means of other diazotizing agents, for example by means of nitrosylsulfuric acid. It is possible for an additional acid to be present in the reaction medium, for example phosphoric acid, sulfuric acid, acetic acid, hydrochloric acid or mixtures of these acids, for example mixtures of phosphoric acid and acetic acid. Advantageously, the diazotization is carried out at temperatures of −10° C., for example −10° C. to room temperature.

The coupling of the diazotized compound of the formula (3) onto the coupling component of the formula (4) is also carried out in a manner, for example in acid, aqueous or aqueous-organic medium, advantageously at temperatures of −10° to 30° C., in particular below 10° C. Examples of acids which are used are hydrochloric acid, acetic acid, sulfuric acid or phosphoric acid. Diazotization and coupling can be carried out, for example, in a one-pot process, i.e. in the same reaction medium.

The quaternization is advantageously carried out in an inert organic solvent, for example in a hydrogen, chlorohydrocarbon or nitrohydrocarbon, such as benzene, toluene, xylene, tetrachloroethane, chloroform, carbon tetrachloride, mono- or dichlorobenzene or nitrobenzene, in an amide or anhydride, such as dimethylformamide, N-methylacetamide or acetic anhydride, in dimethyl sulfoxide or in a ketone, such as acetone or methyl ethyl ketone. Instead of an organic solvent, it is also posible to use an excess of alkylating agent. However, it is also possible to work in an aqueous medium, for example in an aqueous suspension or in, say, glacial acetic acid. The quaternization is advantageously carried out at elevated temperature, for example between about 50° and 130° C. when working in an organic solvent or in pure dimethyl sulfate or between about 20° and 60° C. when working in an aqueous phase. The quaternization is carried out, if desired, with the addition of acid-binding agents, such as an inorganic base, for example NaOH, KOH, sodium acetate, magnesium oxide, magnesium carbonate, sodium carbonate, calcium carbonate or sodium bicarbonate and, if desired, under pressure. The most favourable conditions in each case can be easily determined by a preliminary test.

For the quaternization, known quaternizing agents $R_2$-An are used which introduce the radical $R_2$ and the radical An of which is converted to the anion $An^{\ominus}$. A few examples of quaternizing agents $R_2$-An are: alkyl halides, alkyl esters of sulfuric acid or alkyl esters of organic sulfonic acids, for example methyl chloride, methyl bromide or methyl iodide, ethyl chloride, ethyl bromide or ethyl iodide, propyl bromide or propyl iodide, butyl bromide, dimethyl sulfate, diethyl sulfate, dibutyl sulfate, methyl benzenesulfonate, methyl methanesulfonate, methyl, ethyl, propyl or butyl p-toluenesulfonate, n- and iso-propyl and n-, sec- and tert-butyl benzenesulfonate or 1-chloro-2- butene.

Accordingly, the radical An is preferably halogen (for example Cl, Br, I), alkyl-$SO_4$-, arylsulfonate or alkylsulfonate.

After quaternization, the novel compounds of the formula (1) can be separated from the reaction medium and dried or used directly as a solution. If desired or required, (for example for reasons of solubility) the anion $An^{\ominus}$ in the compounds of the formula (1) obtained can be exchanged for another anion in a manner known per se.

The azo compounds of the formula (1) are used either as powder or granule preparations or in the form of concentrated solutions. Powder preparations are standardized in the usual manner by means of additives, as sodium sulfate, sodium phosphate, sodium chloride, sodium acetate in the presence of dust-removing agents, or the azo compounds are marketed directly as spray-dried preparations. Concentrated dye solutions can be of the aqueous or aqueous/organic type, conventional and highly degradable additives being preferred, such as organic acids, preferably acetic acid, formic acid, lactic acid, citric acid, amides, such as formamide, dimethylformamide, urea, alcohols, such as glycol, diglycol, diglycol ether, preferably the methyl or ethyl ether.

Novel cationic azo dyes of the formula (1) are used for the dyeing and, with the addition of binders and solvents, for the printing of materials which can be dyed by means of cationic dyes, in particular textile fibre materials; these materials are, for example, homo- or mixed polymers of acrylonitrile (polyacrylonitrile) or synthetic polyamides or polyesters modified by acid groups. Furthermore, the novel cationic azo compounds also serve for the dyeing of never-dried tow (dyeing of fibres in the gel state), plastic compositions, preferably comprising the polymers mentioned, and of tanned cellulose materials, of leather and paper and for the dyeing of mixed fabrics made of polyacrylonitrile material and wool.

In particular flakes, fibres, filaments, ribbons, woven or knitted fabric made of polyacrylonitrile or mixed polymers of acrylonitrile with other vinyl compounds, such as vinyl chloride, vinylidene chloride, vinyl fluoride, vinyl acetate, vinylpyridine, vinylimidazole, vinyl alcohol, acrylic and methacrylic esters and acrylamides and methacrylamides, asym.-dicyanoethylene, containing at least 85% of acrylonitrile. Likewise, flakes fibres, filaments, ribbons, woven or knitted fabrics made of acid-modified synthetic materials, in particular acid-modified aromatic polyesters and acid-modified polyamide fibres can be dyed. Examples of acid-modified aromatic polyesters are polycondensation products of sulfoterephthalic acid with ethylene glycol, i.e. sulfo-containing polyethylene glycol terephthalate.

The dyeing is preferably carried out from aqueous neutral or acid medium by the exhaust method, if desired under pressure or by the continuous process. In this process, the dye bath is entered, for example, at about 20° to 60° C. with the material to be dyed and dyeing is then carried out the boiling temperature. However, it is also possible to dye under pressure above 100° C., for example at 110°-130° C., in a pressure dyeing apparatus. A textile material to be dyed can be present in a wide range of different forms, for example as fibre, filament, woven fabric, knitted fabric, piece goods or finished goods.

When applied to the abovementioned materials, the compounds according to the invention of the formula (1) lead to blue dyeings or prints which are distinguished by very good properties, in particular high reduction and pH stability, rubbing and sublimation fastness, very good exhaust properties and high light fastness. In particular the high steaming and decatizing fastness properties should be mentioned.

The compounds according to the invention of the formula (1) can be used as dyes for the applications described above as individual compounds or, alternatively, in mixtures containing at least two compounds of the formula (1).

Furthermore, the dyes of the formula (1) are suitable as the blue component in a mixture with a cationic yellow and a cationic red dye for the trichromatic dyeing of polyacrylonitrile material.

Finally, they also are used in dye mixtures for the dyeing in navy or black shades. For this purpose, at least one blue dye of the formula (1) is mixed with a yellow and a red and, if desired, a further blue dye.

The examples which follow illustrate the invention further, parts and percentages are by weight, unless stated otherwise.

EXAMPLE 1 a) 90 parts of 2-amino-6-methybenzothiazole are suspended in 600 parts of 48% sulfuric acid and diazotized with 165 parts of 40% nitrosylsulfuric acid at −10° to −5° C. over a period of one hour. After stirring at −10° to −5° C. for one hour, the excess of diazotizing reagent is destroyed with sulfamic acid. This gives a deep-red diazo solution.

92 parts of N-ethyl-N-hydroxyethyl-1,3-toluidine are dissolved in 130 parts of 26% sulfuric acid and cooled to −10° to −5° C. by adding 225 parts of ice. The previously prepared diazo solution is added dropwise to this solution at −10° to −5° C. over a period of 10 minutes. The resulting black-green suspension is stirred for one hour and then brought to a pH of 1.5 by adding about 950 parts of 30% sodium hydroxide solution, while the temperature is allowed to rise to at most 25° C. After filtration and washing 3 times with 500 parts each of water, 150 parts of azo dye are obtained, which corresponds to a yield of 81% of theory.

b) 37 parts of this azo dye are suspended at 20° to 25° C. in 180 parts of water with the addition of 0.5 part of a cationic dispersant, and 38 parts of dimethyl sulfate are added. Durinmg the two-hour reaction at 20° to 25° C., the pH is maintained between 3 and 4 by metering in about 100 parts of a 40% aqueous sodium acetate solution. The pH is then brought to 1.5 with about 7 parts of 32% hydrochloric acid, and the dye formed is precipitated by adding 400 parts of a 6% aqueous sodium chloride solution and then another 20 parts of solid sodium chloride. The product is filtered, washed with 400 parts of a 6% aqueous sodium chloride solution, filtered off thoroughly with suction and dried at 60° to 70° C. to give 37 parts of the dye of the formula

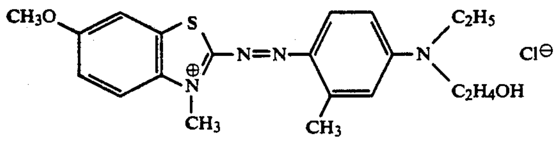

The dye dyes polyacrylonitrile textile material in a pure blue shade.

The dyeing has a high performance level with respect to light, steaming and decatizing fastness.

When blended fabrics containing polyacrylonitrile and wool are dyed, the above dye is furthermore distinguished by a high reduction and pH stability and good reservation properties.

EXAMPLE 2

37 parts of the azo dye obtained according to Example 1a) are suspended in 65 parts of glacial acetic acid, 1.4 parts of magnesium oxide are added, and the resulting suspension is heated to 50° C. 19 parts of dimethyl sulfate are uniformly added dropwise at 50° to 60° C. over a period of one hour, and the reaction mixture is stirred for another 3 hours. The pH is brought to 2.2 by adding about 20 parts of a 10% aqueous sodium acetate solution, and the by-product methyl acetate is removed by distillation under slight vacuum. After careful clarification with the addition of a kieselguhr filtering aid, a concentrated solution of the cationic dye of the formula given in Example 1b) is obtained. The solution can be diluted as desired with water, glacial acetic acid or other solvents and used directly for the dyeing of polyacrylonitrile or polyacrylonitrile-containing blended fabrics. The fastness level of the dyeings obtained corresponds to that of Example 1.

EXAMPLE 3

100 parts of a polyacrylonitrile yarn (Orlon) are dyed in a laboratory dyeing apparatus in 4000 parts of an aqueous dye liquor containing 0.24 part of the cationic dye from Example 1, 1 part of a commercially available cationic retarder, 10 parts of sodium sulfate (anhydrous) and 1 part of sodium acetate by enetering the liquor with the yarn at 30° C., heating it uniformly to 100° C. over a period of 45 minutes, and continuing the dyeing at 100° C. for another 90 minutes to give a blue level dyeing.

EXAMPLES 4-21

The following dyes are obtained in an analogous manner as described in Examples 1 and 2:

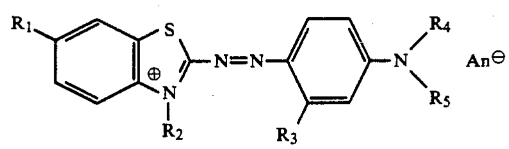

| Example | $R_1$ | $R_2$ | $R_3$ | $R_4$ | $R_5$ |
|---|---|---|---|---|---|
| 4 | $OC_2H_5$ | $CH_3$ | $CH_3$ | $C_2H_5$ | $C_2H_4OH$ |
| 5 | $OCH_3$ | $CH_3$ | $CH_3$ | $CH_3$ | $C_2H_4OH$ |
| 6 | $OC_2H_5$ | $CH_3$ | $CH_3$ | $CH_3$ | $C_2H_4OH$ |
| 7 | $OCH_3$ | $C_2H_5$ | $CH_3$ | $C_2H_5$ | $C_2H_4OH$ |
| 8 | $OC_2H_5$ | $C_2H_5$ | $CH_3$ | $C_2H_5$ | $C_2H_4OH$ |
| 9 | $OCH_3$ | $C_2H_5$ | $CH_3$ | $CH_3$ | $C_2H_4OH$ |
| 10 | $OC_2H_5$ | $C_2H_5$ | $CH_3$ | $CH_3$ | $C_2H_4OH$ |
| 11 | $OCH_3$ | $CH_3$ | $CH_3$ | $CH_3$ | $C_3H_6OH$ |
| 12 | $OC_2H_5$ | $CH_3$ | $CH_3$ | $C_2H_5$ | $CH_2{-}CHOH{-}CH_3$ |
| 13 | Cl | $CH_3$ | $CH_3$ | $C_2H_5$ | $C_2H_4OH$ |
| 14 | Cl | $CH_3$ | $CH_3$ | $CH_3$ | $C_2H_4OH$ |
| 15 | $OCH_3$ | $CH_3$ | $C_2H_5$ | $C_2H_5$ | $C_2H_4OH$ |
| 16 | $OC_2H_5$ | $CH_3$ | $C_2H_5$ | $CH_3$ | $C_2H_4OH$ |
| 17 | $OC_2H_5$ | $CH_3$ | $C_2H_5$ | $C_2H_5$ | $C_2H_4OH$ |
| 18 | $OCH_3$ | $CH_3$ | $C_2H_5$ | $CH_3$ | $C_2H_4OH$ |
| 19 | $OC_2H_5$ | $CH_3$ | $C_2H_5$ | $CH_3$ | $C_2H_4OH$ |
| 20 | $OC_2H_5$ | $C_2H_5$ | $C_2H_5$ | $CH_3$ | $C_2H_4OH$ |
| 21 | $OCH_3$ | $C_2H_5$ | $C_2H_5$ | $C_2H_5$ | $C_2H_4OH$ |

Polyacrylonitrile yarn (Orlon) is dyed according to Example 3, except that the dyes of Examples 4 to 21 are used, to give likewise pure blue to reddish blue dyeings.

EXAMPLE 22

100 parts of polyacrylonitrile yarn (Orlon) are dyed in a laboratory dyeing apparatus in 4000 parts of an aqueous dye liquor containing 0.39 part of the dye from Example, 1, 0.87 part of the yellow dye of the formula

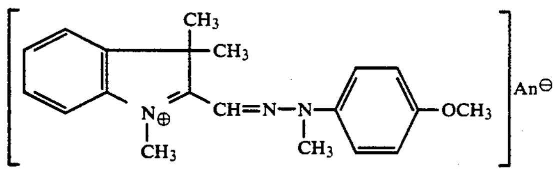

(commercial grade containing 34% by weight of the dye cation), 0.195 part of the red dye of the formula

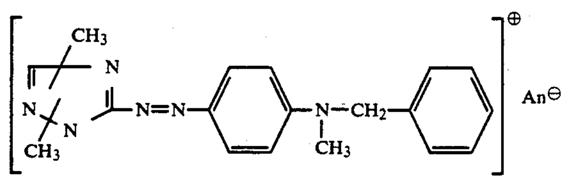

(commercial grade containing 34% by weight of the dye cation) 1 part of a commercially available cationic retardant, 10 parts of sodium sulfate (anhydrous) and 1 part of sodium acetate by entering the liquor with the yarn at 30° C., heating evenly to 100° C. over a period of 45 minutes and continuing the dyeing at 100° C. for another 90 minutes. A dyeing in a pure black shade is obtained.

EXAMPLE 23

100 parts of polyacrylonitrile yarn (Orlon) are dyed in a laboratory dyeing apparatus in 4000 parts of an aqueous dye liquor containing 0.25 parts of the cationic dye from Example 1, 0.9 part of the yellow dye from Example 22, 0.315 part of the red dye from Example 22, 0.405 part of the blue dye of the formula

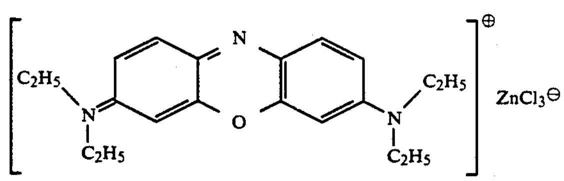

(commercial grade containing 40% by weight of the dye cation), 1 part of a commercially available cationic retarder, 10 parts of sodium sulfate (anhydrous) and 1 part of sodium acetate by entering the liquor with the yarn at 30° C., heating evenly to 100° C. over a period of 45 minutes and continuing the dyeing at 100° C. for another 90 minutes. A dyeing in a pure black shade is obtained.

EXAMPLE 24

Analogously to Example 22, black dyeings are obtained by using equivalent amounts of the dyes from Examples 4 to 21 instead of the dye from Example 1.

EXAMPLE 25

Analogously to Example 23, black dyeings are obtained by using equivalent amounts of the dye from Examples 4 to 21 instead of the blue azo dye from Example 1 and using the blue oxazine dye from Example 23 or instead equivalent amounts of one of the following dyes:

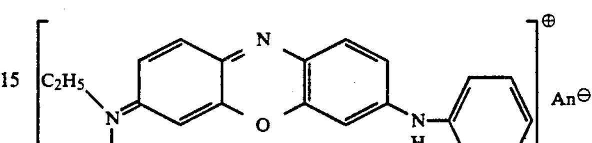

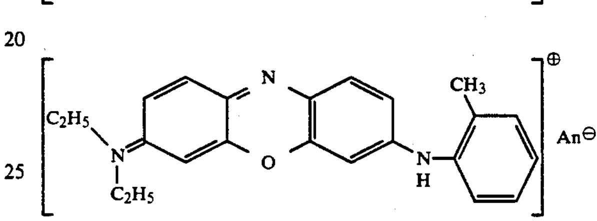

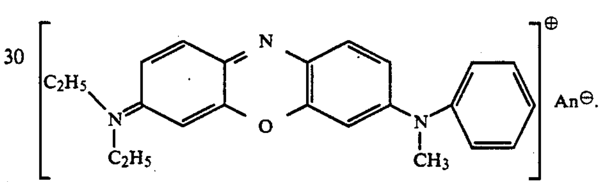

EXAMPLE 26

Analogously to Examples 22 to 25, black dyeings are obtained by using equivalent amounts of the yellow dye of the formula

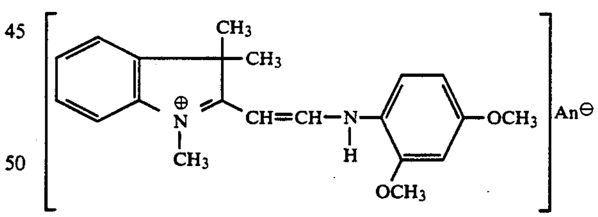

or

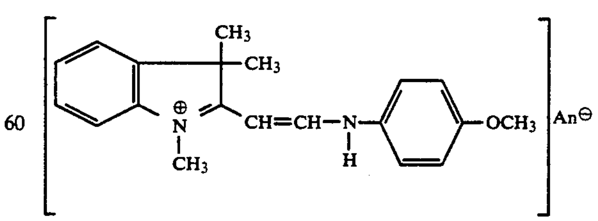

instead of the yellow dye of the formula given in Example 22 and/or equivalent amounts of the red dye of the formula

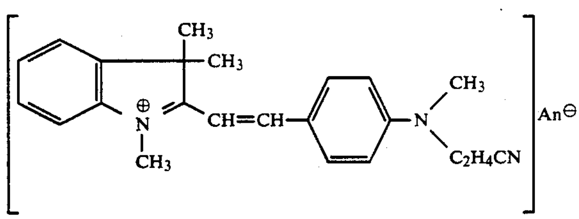

or

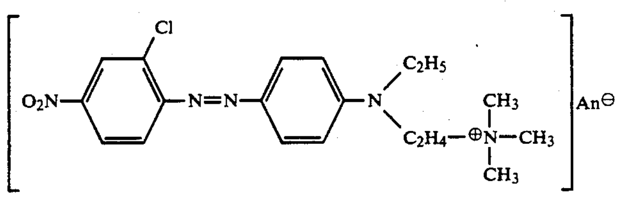

or

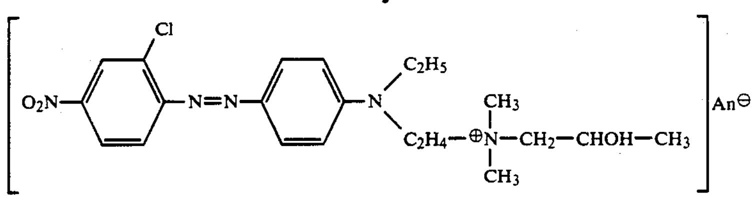

or

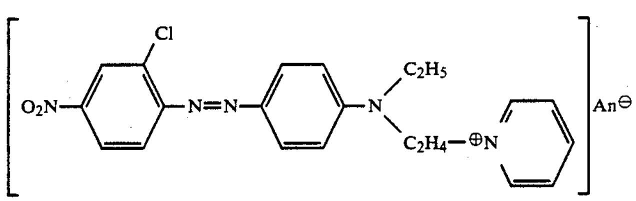

instead of the red dye of the formula given in Example 22.

EXAMPLE 27

4 g of a polyacrylonitrile/wool staple blended fabric having a PAC content of 55% are inserted into an AHIBA laboratory dyeing apparatus containing an aqueous dye liquor of 5% calcinated Glauber salt, 2% of 80% acetic acid and 1% of a commercially available precipitation inhibitor at about 50° C. After 10 minutes, 0.15% of the blue dye of the formula

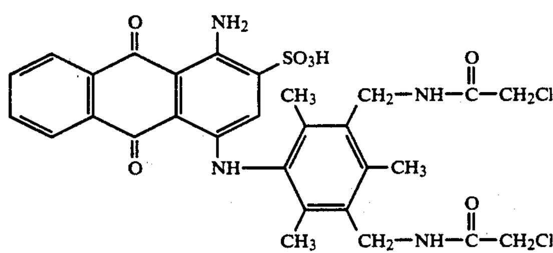

is added, and the dye bath is then heated to a temperature of 80° C. over a period of 30 minutes. After the pH has been brought to 4 to 4.5, 0.05% of the cationic dye from Example 1 is added, the dye bath is then further heated to a temperature of 98°-100° C. over a period of another 30 to 40 minutes and maintained at this temperature for 45 minutes (liquor ratio 1:40). The dye bath is allowed to cool, the material is then rinsed to give a fabric dyed in completely plain blue.

What is claimed is:

1. A process for the dyeing of polyacrylonitrile materials, which comprises using a dye of the formula

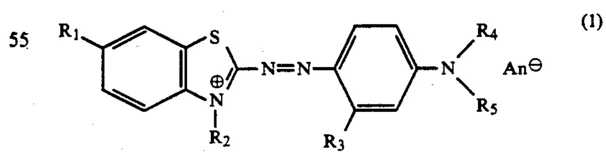

(1)

in which $R_1$ is $C_1$-$C_4$alkoxy,
$R_2$ is $C_1$-$C_4$alkyl,
$R_3$ is $C_1$-$C_4$alkyl,
$R_4$ is $C_1$-$C_2$alkyl,
$R_5$ is hydroxyethyl or hydroxypropyl, and
$An^{\ominus}$ is an anion, in which $R_3$ and $R_4$ are not both ethyl at the same time.

2. A process according to claim 1, wherein a dye of the formula (1) is used in which $R_1$ is methoxy or ethoxy.

3. A process according to claim 1, wherein a dye of the formula (1) is used in which $R_2$ is methyl or ethyl.

4. A process according to claim 3, wherein $R_2$ is methyl.

5. A process according to claim 1, wherein a dye of the formula (1) is used in which $R_3$ is methyl or ethyl.

6. A process according to claim 5, wherein $R_3$ is methyl.

7. A process according to claim 1, wherein a dye of the formula (1) is used, in which $R_4$ is methyl or ethyl and $R_5$ is hydroxyethyl.

8. A process according to claim 1, wherein a dye of the formula

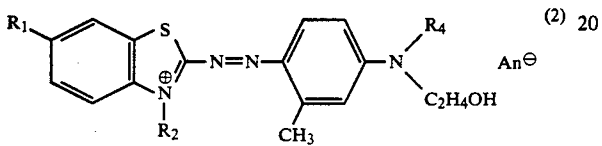

is used in which $R_2$ and $R_4$, independently of one another, are each methyl or ethyl and $R_1$ is methoxy or ethoxy.

9. A process according to claim 8, wherein a dye of the formula (2) is used in which $R_1$ is methoxy, $R_2$ is methyl and $R_4$ is ethyl.

10. A process for the trichromatic dyeing of polyacrylonitrile materials by means of cationic dyes, which comprises using a blue dye of the formula (1) according to claim 1 together with a yellow or orange and a red cationic dye.

11. A process for the dyeing of polyacrylonitrile materials is navy or black shades, wherein a blue dye of the formula (1) according to claim 1 is used together with a yellow or orange and a red and, if desired, a further blue dye.

12. A process according to either one of 10 or 11, wherein a blue dye of the formula (1) according to claim 1 is used together with a yellow dye of the formula

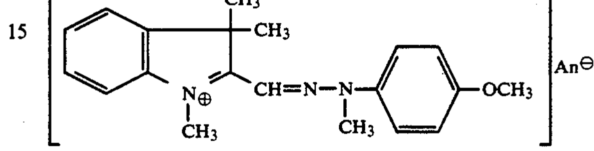

and a red dye of the formula

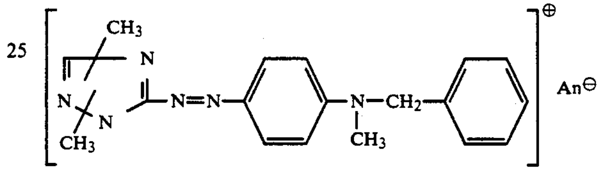

in which $An^\ominus$, independently of one another, are each an anion.

13. A dyed polyacrylonitrile material obtained by the process according to claim 1.

* * * * *